E. A. GRAHAM.
TELEPHONIC EXCHANGE SWITCHBOARD.
APPLICATION FILED JUNE 21, 1907.

915,592.

Patented Mar. 16, 1909.
8 SHEETS—SHEET 1.

E. A. GRAHAM.
TELEPHONIC EXCHANGE SWITCHBOARD.
APPLICATION FILED JUNE 21, 1907.

915,592.

Patented Mar. 16, 1909.

Witnesses.
Inventor
E. A. Graham
Attorney.

E. A. GRAHAM.
TELEPHONIC EXCHANGE SWITCHBOARD.
APPLICATION FILED JUNE 21, 1907.

915,592.

Patented Mar. 16, 1909.
8 SHEETS—SHEET 4.

Witnesses.

Inventor

E. A. GRAHAM.
TELEPHONIC EXCHANGE SWITCHBOARD.
APPLICATION FILED JUNE 21, 1907.

915,592.

Patented Mar. 16, 1909.
8 SHEETS—SHEET 7.

Fig.10.

Witnesses

Inventor
E. A. Graham
Attorney

E. A. GRAHAM.
TELEPHONIC EXCHANGE SWITCHBOARD.
APPLICATION FILED JUNE 21, 1907.

915,592.

Patented Mar. 16, 1909.
8 SHEETS—SHEET 8.

Fig. 11.

Witnesses
J. J. Bringham
J. C. Webb.

Inventor
E. A. Graham
per
W. J. d Wirt
Attorney.

UNITED STATES PATENT OFFICE.

EDWARD ALFRED GRAHAM, OF BROCKLEY, LONDON, ENGLAND, ASSIGNOR TO HIMSELF AND ALFRED GRAHAM AND COMPANY, OF BROCKLEY, LONDON COUNTY, ENGLAND.

TELEPHONIC-EXCHANGE SWITCHBOARD.

No. 915,592.  Specification of Letters Patent.  Patented March 16, 1909.

Application filed June 21, 1907. Serial No. 380,075.

*To all whom it may concern:*

Be it known that I, EDWARD ALFRED GRAHAM, a subject of the King of Great Britain and Ireland, residing at Brockley, in the county of London, England, have invented Improvements in or Relating to Telephonic-Exchange Switchboards, of which the following is a specification.

This invention consists of improvements in or relating to telephonic exchange switchboards adapted for use in connection with telephones generally but specially suitable for use in connection with loud speaking naval telephones.

It has for object to provide a switch-board of a compact and advantageous construction, capable of being easily and efficiently worked, and which shall occupy a comparatively small space regard being had to the number of telephonic instruments or stations connected thereto.

It also has for object to provide a switchboard wherein the various electrical connections are well protected against rough usage and weather, and are so arranged that easy access can be gained to all parts, that those parts that are liable to fail can be readily and quickly detached from the circuits and removed for examination and replaced by spare parts in the event of a fault occurring therein, and that faults can be easily discovered and remedied; and wherein slackness in the plug cords can be readily taken up so as to allow of the contact plugs normally assuming a vertical position convenient for handling.

The switch-board according to the example shown, comprises a metal casing $a$ having a central chamber $b$ adapted to receive a number of separately removable sections or units $c$; an upper chamber $d$ adapted to contain a number of electrical terminals; and a lower chamber $e$ adapted to receive a number of independent contact carrying and spring influenced drums $f$ and guide pulleys $g$ for the plug cords $h$.

The chambers $b$, $d$, $e$, have front doors $b^1$, $d^1$, $e^1$ respectively that can be readily opened and can be closed in a practically water tight manner, the door $b^1$ being preferably hinged and secured by pivotal wing nuts and bolts $b^2$. The terminal chamber $d$ is also provided with a number of glands $d^2$ or openings, through which the conductors from external telephonic apparatus, electric generator or generators, bells and so forth are led, it may be in a water tight manner.

Figure 4:
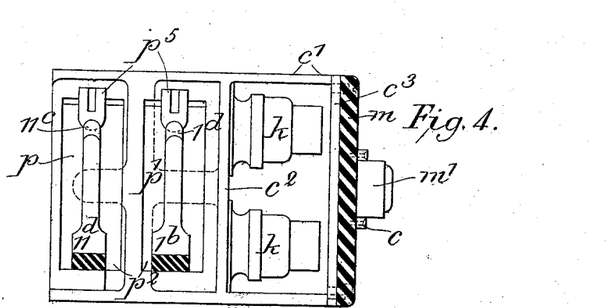
Fig. 4 is a plan and Fig. 5 an underside view of a detail of Figs. 2 and 3.
Figure 5:
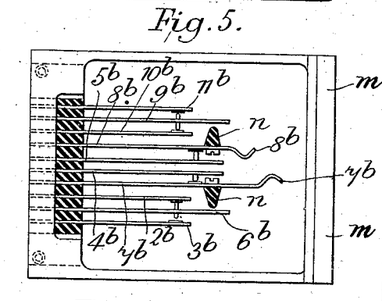

The casing $a$ has a horizontal shelf $i$ formed with holes $i^1$ for the flexible plug cords $h$ and adapted to normally support the contact plugs $j$ in a vertical position. Each removable section or unit $c$ comprises (see Figs. 3, 4 and 5) a frame or block $c^1$ (hereinafter called a carrier) which has two vertical supports $c^2$, $c^3$, arranged one in front of the other, the rear one $c^2$ carrying two lamp sockets $k$ for two incandescent electric lamps $k^1$, $k^2$, and the front one $c^3$ carrying a plate of insulating material $m$ provided with a socket $m^1$ and upon which are secured eleven independent terminals, hereinafter called for distinction 1 to 11 respectively. Within the lower hollow portion of the carrier $c^1$ is fixed a jack comprising a number of spring contact blades, ten in the example now being described, and hereinafter referred to for distinction as $2^b$ to $11^b$ respectively. Of these contacts (see Fig. 5) $6^b$ is located between $2^b$ and $3^b$ and normally bears against $2^b$; $9^b$ is located between $10^b$ and $11^b$ and normally bears against $10^b$, and contacts $7^b$ and $8^b$ are arranged at opposite sides of $4^b$ and $5^b$ against which they normally respectively bear but are adapted to be forced apart by a contact plug $j$ inserted between them, so as to be moved out of connection with contacts $4^b$ and $5^b$ and cause insulating blocks $n$ upon them to move the contacts $6^b$ and $9^b$ respectively out of connection with contacts $2^b$ and $10^b$ and into connection with contacts $3^b$ and $11^b$ respectively.

Figure 2:
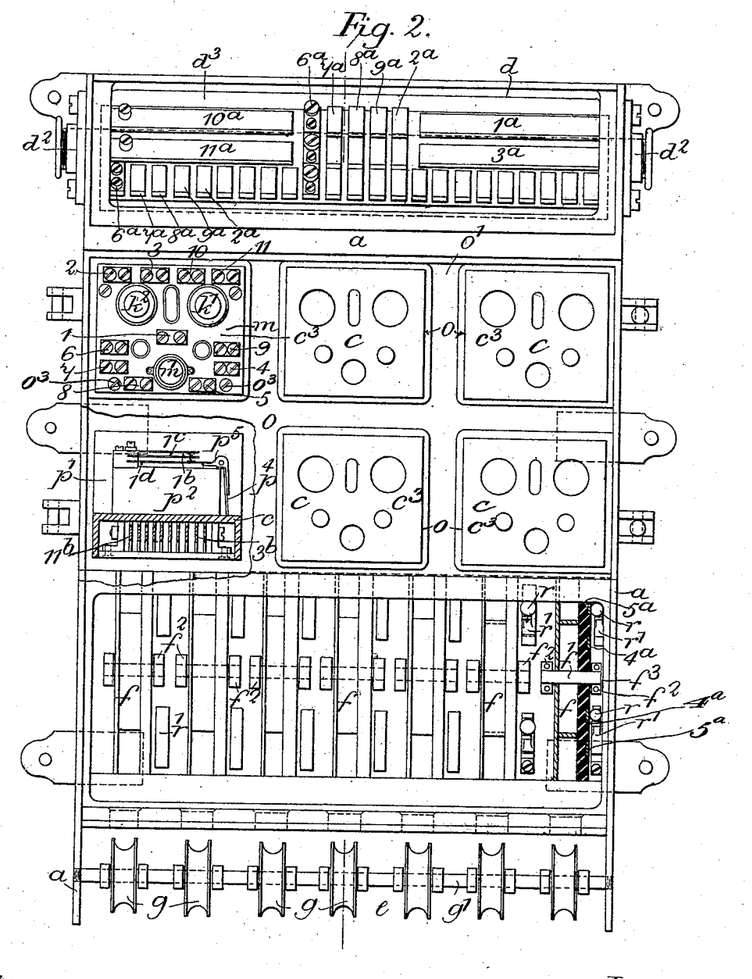
Figure 3:
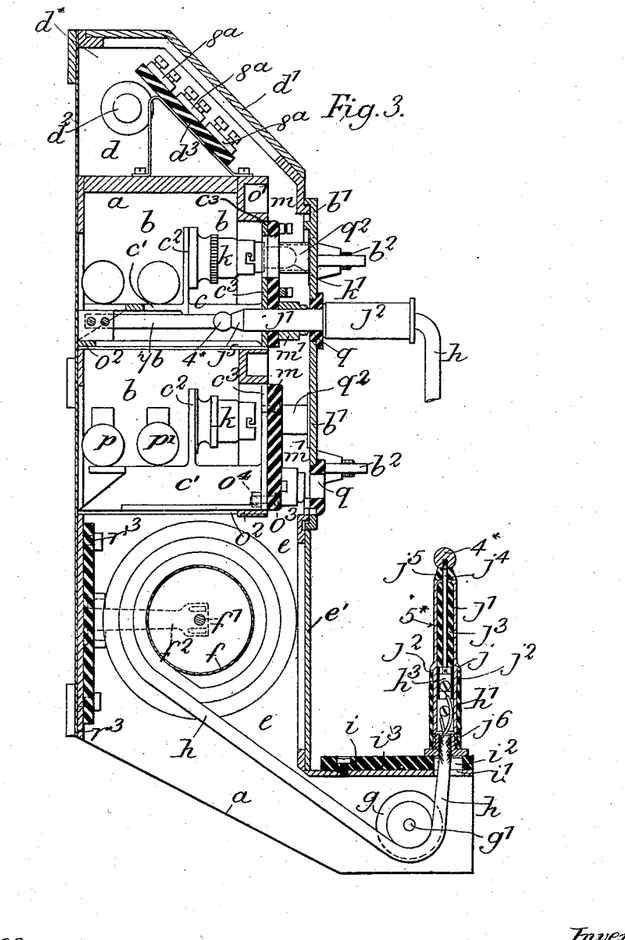
Figure 6:
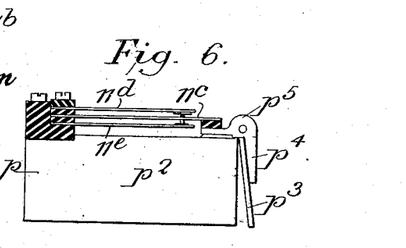
Figs. 6 and 7 are respectively a sectional front elevation and a side elevation of other details of Fig. 2.

Each carrier $c^1$ extends through a rectangular hole $o$ in a vertical plate $o^1$ Figs. 2 and 3 in the section chamber $b$ and rests upon a plate or upon bars $o^2$ to which it is detachably fixed, as by set screws $o^3$ entering lugs $o^4$ on said bars. Upon the carrier $c^1$ behind the rear plate $c^2$, are mounted two relays $p$, $p^1$, viz. a speaking relay $p$ and a ringing relay $p^1$, each of these relays comprising an electro-magnet $p^2$ provided with an armature $p^3$ carried by one arm $p^4$ of a bell crank lever $p^4$, $p^5$, and three spring blade contacts, those for the ringing relay $p^1$ being hereinafter called for distinction $1^b$, $1^c$ and $1^d$ (see Fig. 2) and those for the speaking relay $p$ being hereinafter called for distinction $11^c$, $11^d$ and $11^e$ (see Fig. 6). Relay contact $1^c$ is arranged between but is normally out of connection with contacts $1^b$ and $1^d$ but the three contacts are arranged to be pressed into electrical connection with each other by the second arm $p^5$ of the bell crank lever $p^4$, $p^5$ of the ringing relay $p^1$ when the same is energized. Relay contact $11^c$ is arranged between the contacts $11^d$ and $11^e$ and normally bears against the latter but is arranged to be moved therefrom and caused to bear against the former by the second arm $p^5$ of the bell crank lever $p^4$, $p^5$ of the speaking relay $p$ when the same is energized.

The door $b^1$ of the section chamber $b$ is provided with a number of plug holes $q$ each arranged opposite the socket $m^1$ of a corresponding removable section $c$, and also with two glazed apertures $q^1$ arranged opposite the ringing and speaking lamps $k^1$, $k^2$ (Fig. 2) the glass receivers of which may be respectively red and white, and be arranged to be surrounded, when the door $b^1$ is closed, by tubes $q^2$ attached to the inner side of the door $b^1$.

Within the terminal chamber $d$ and upon an insulated support $d^3$ therein, are fixed four terminal or bus bars, $1^a$, $3^a$, $10^a$ and $11^a$, and also a number of groups of terminals, one group for each removable section $c$ and corresponding telephonic apparatus at a distance, each group comprising five terminals $2^a$, $6^a$, $7^a$, $8^a$ and $9^a$ (Fig. 2).

Figure 7:
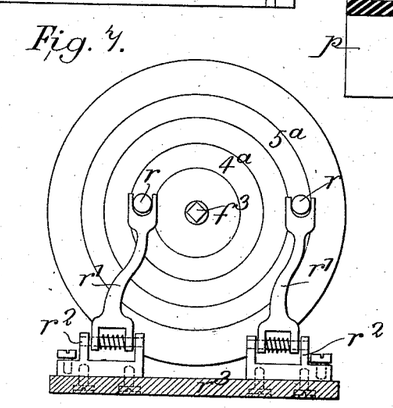

There is a contact drum $f$ and plug $j$ for each telephone connected to the switch-board and also one for the exchange telephone. Each drum $f$ is made as a spring drum adapted to be initially wound up and mounted to turn about a horizontal axis $f^1$ in bearings carried by arms fixed to the casing $a$. In the example, each drum $f$ is carried loosely by a spindle $f^1$ which is mounted in brackets $f^2$ and has a squared end portion $f^3$ whereby the spring (not shown) coiled around and having one end attached to the spindle $f^1$ and its other end attached to the drum $f$, can be wound up and then locked by the aforesaid squared portion. Each drum has on one side two insulated contact rings $4^a$ and $5^a$ (Fig. 7) against each of which bears a contact, preferably in the form of a ball or roller $r$, carried by a spring-actuated arm $r^1$ mounted to turn in an insulated bearing $r^2$ fixed to a stationary support $r^3$ within the drum chamber $e$. The guide pulleys $g$ for the plug cords $h$ are mounted upon a shaft $g^1$ so arranged below the shelf $i$ that each plug cord $h$ extends vertically upward, or nearly so, through the hole $i^1$ in the shelf and a hole $i^2$ in a fixed plate $i^3$ to the corresponding contact plug $j$. Each plug cord $h$ carries two flexible insulated conductors $h^1$ (Figs. 3 and
8) that are separately connected at their inner ends to the two insulated contact rings $4^a$ and $5^a$ on the corresponding contact drum $f$ and at their outer ends are separately connected to two insulated terminals $h^3$ within the corresponding plug $j$. Each plug $j$ comprises a metal tube $j^1$ that is connected through one of the terminals $h^3$ and one of the flexible conductors $h^1$ to the rotary contact ring $5^a$ and forms a cylindrical contact (hereinafter called for distinction 5*) that is adapted to be pushed through any of the plug holes $q$ in the door $b^1$ of the section chamber $b$ and inserted between the corresponding jack contacts $7^b$ and $8^b$. The lower portion of the metal tube $j^1$ is provided with a sleeve of insulating material $j^2$. The upper portion of the tube $j^1$ is provided internally with a tube $j^3$ of insulating material through which extends a metal rod $j^4$ the lower inner end of which is connected through the other terminal $h^3$ and flexible conductor $h^1$ to the rotary contact $4^a$ and the upper or outer end of which is connected to another plug contact (hereinafter called for distinction 4*) that is preferably of spherical or partly spherical shape and is separated from the contact 5* by a ring of insulating material $j^5$. The two plug contacts 5* and 4* are adapted to make connection with the jack contacts $7^b$ and $8^b$ respectively when the plug $j$ is forced between the latter contacts. Each cord $h$ may extend through a gland $j^6$ that is screwed into the lower end of the plug $j$ and serves as a base or support for carrying the same.

Figure 8:
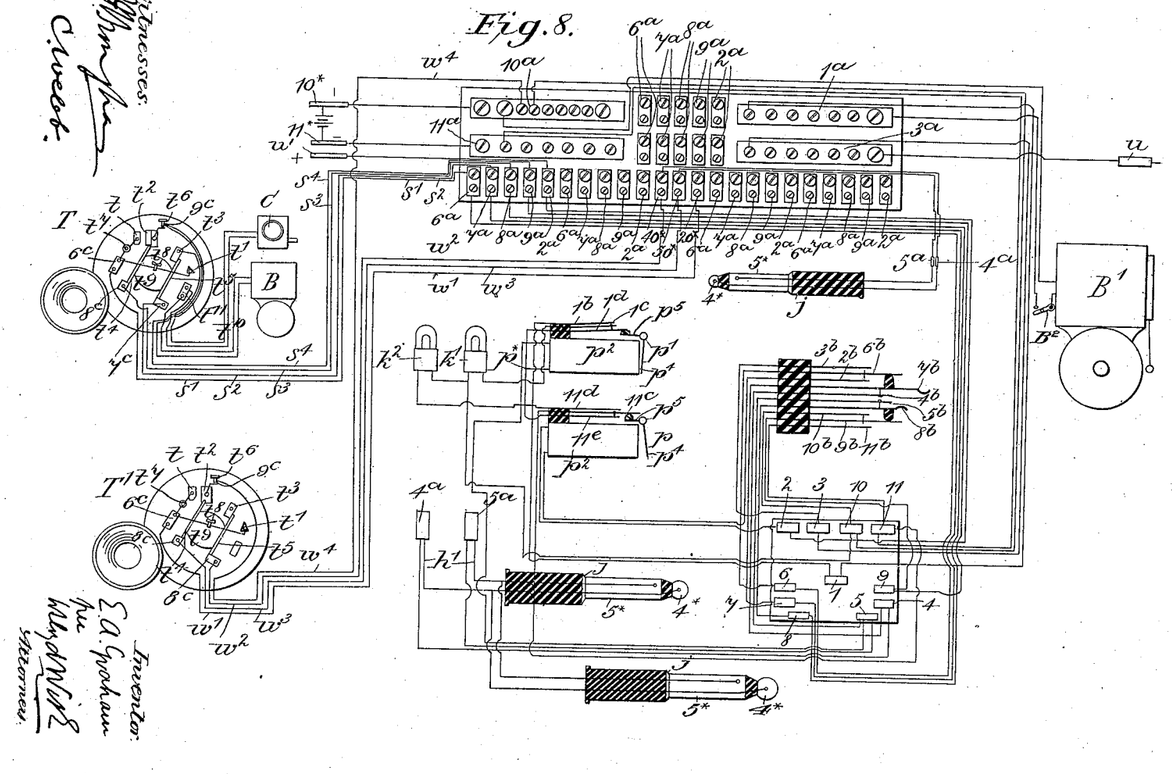
Figs. 8, 9, 10 and 11 are diagrams illustrating different circuit connections.

The several terminals in each removable section $c$ are connected up as follows, as will be apparent from the diagram Fig. 8 of the accompanying drawings:—Terminal 1 is connected to the bus bar $1^a$. Terminals 2, 3, 4, 5, 6, 7, 8, 9, 10 and 11 are connected respectively to the spring contacts $2^b$, $3^b$, $4^b$, $5^b$, $6^b$, $7^b$, $8^b$, $9^b$, $10^b$, and $11^b$ of the corresponding jack, terminal 2 being connected to the jack contact $2^b$ through the magnet winding $p^2$ of the corresponding speaking relay $p$. Terminals 2, 6, 7, 8 and 9 are also connected to the corresponding terminals $2^a$, $6^a$, $7^a$, $8^a$, $9^a$, and terminal 3 to the bus bar $3^a$ in the terminal chamber. Terminals 4 and 5 are also connected to the insulated rotary contacts $4^a$ and $5^a$ on the corresponding contact drum $f$ and are also connected through the contacts $r$ (Fig. 7) and the flexible conductors $h^1$ to the contacts 4* and 5* of the corresponding plug. Terminals 10 and 11 are also separately connected to the bus bar $10^a$ and $11^a$ respectively in the terminal chamber $d$.

The contacts $1^b$, $1^c$, $1^d$ of the corresponding ringing relay $p^1$ are connected up as follows:—Contact $1^b$ is connected to terminal 1, contact $1^c$ is connected to one terminal of the corresponding ringing lamp $k^1$, and contact $1^d$ is connected to one end $p^*$ of the magnet winding $p^2$ of the corresponding ringing relay $p^1$ the other end of which is connected to the contact $5^a$. The spring contacts $11^c$, $11^d$, and $11^e$ of the speaking relay $p$ are connected up as follows:—Contact $11^c$ is connected to terminal 11; contact $11^d$ is connected to one terminal of the corresponding speaking lamp $k^2$; and contact $11^e$ is connected to one end $p^*$ of the magnet winding $p^2$ of the corresponding ringing relay $p^1$ the other end of which is, as before stated, connected to the rotary contact $5^a$. The other terminals of the two lamps $k^1$, $k^2$ are connected to terminal 10.

Bus bars $1^a$ and $10^a$ are connected to the terminals of the exchange bell $B^1$ which may, when desired, be put out of circuit by means of a suitable switch $B^2$. Bus bar $3^a$ is connected to the negative terminal $u$ (Fig. 9) of one or more electric generators supplying current for working the speaking circuits of a telephone system. Bus bars $10^a$ and $11^a$ are connected to the positive and negative supply mains $10^*$, $11^*$ respectively of an electric generator for operating the bell and lamp circuits. Each terminal $2^a$ is connected to the positive terminal $u^1$ (Fig. 9) of the electric generator or generators supplying current for working the speaking circuits above referred to.

Figure 1:
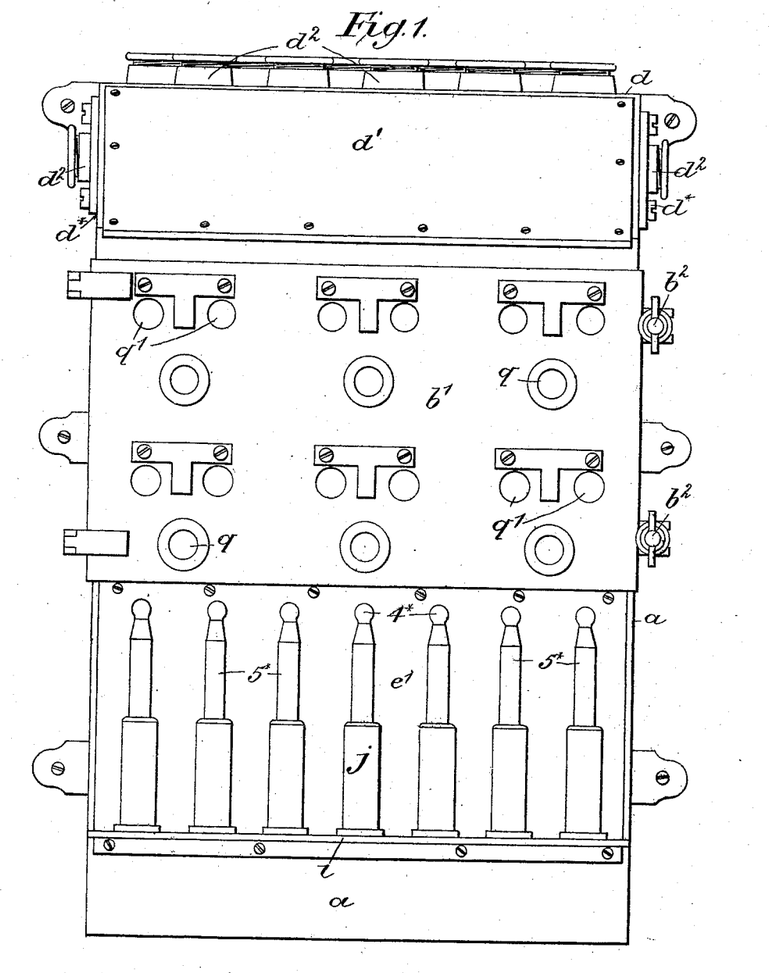
Figures 1, 2 and 3 of the accompanying illustrative drawings show one construction of exchange switch board embodying the present invention, Fig. 1 being a front elevation of the same complete, Fig. 2 a similar view to Fig. 1 with some of the parts removed, others shown in section, and others diagrammatically indicated, and Fig. 3 a sectional side elevation.
Figure 9:
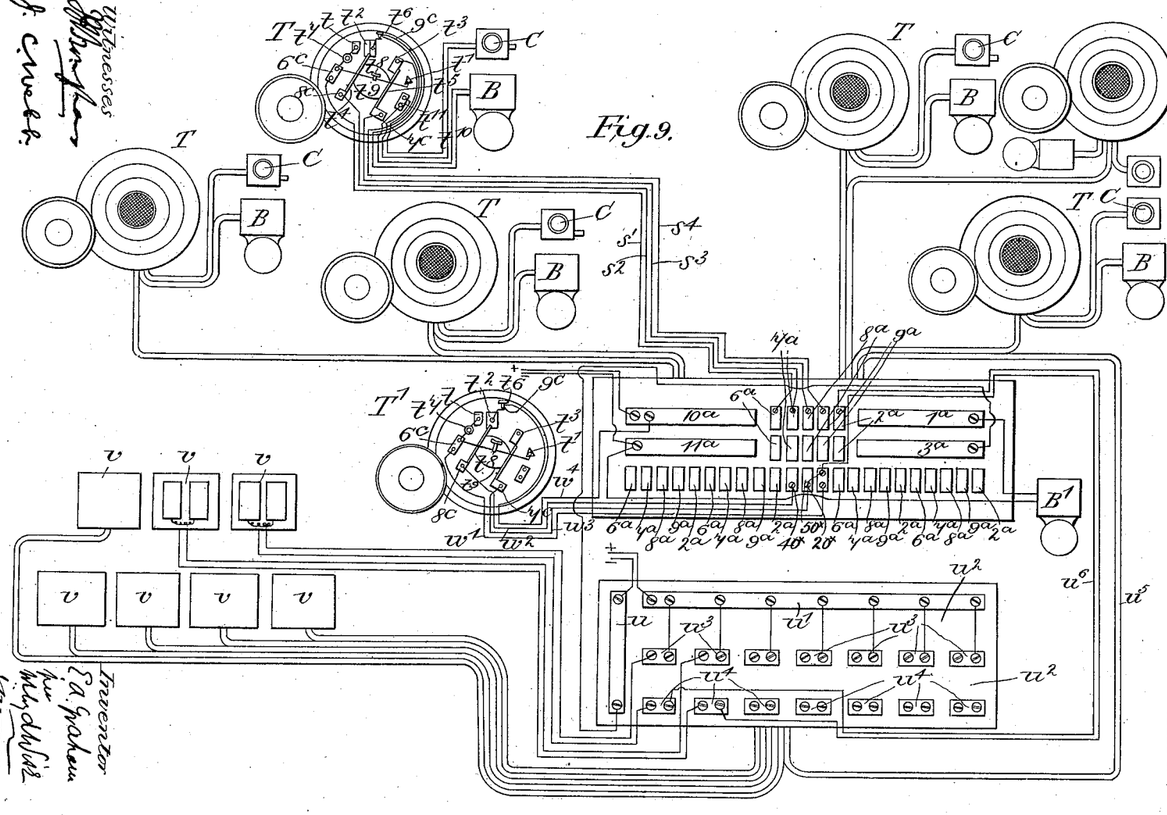

The switch board shown in Figs. 1, 2, and 3 is designed for use with six telephonic instruments at distant places. Fig. 9 shows the six telephonic instruments T with bells B and indicators C, and also the exchange telephonic instrument $T^1$ and bell $B^1$. This figure also shows, as respects one group of terminals $6^a$, $7^a$, $8^a$, and $9^a$, how the terminals in each group are respectively connected by conductors $s^1$, $s^2$, $s^3$, $s^4$ to the fixed terminals $6^c$, $7^c$, $8^c$ and $9^c$ of the corresponding telephonic instrument T at a distant place. This instrument is also provided with four fixed contacts $t$, $t^1$, $t^2$, $t^3$, two movable contacts $t^4$ and $t^5$, the telephonic transmitter $t^7$, and the telephonic receiver $t^8$. Terminal $6^c$ is connected to one terminal of the transmitter $t^7$ and of the receiver $t^8$, the other terminals of which are respectively connected to contacts $t$ and $t^1$. Contact $8^c$ is connected to the movable contact $t^4$ which normally bears against contact $t^2$, but can, by moving a rotary cam $t^9$, be forced against contact $t$. Contact $7^c$ is connected to the movable contact $t^5$ which normally bears against contact $t^3$, but can, by moving the said cam $t^9$, be forced against contact $t^1$. To contact $9^c$ is connected a spring contact $t^6$ that is normally disconnected from contact $t^2$ but can be temporarily forced into connection with such contact. The corresponding telephone bell B and indicator C are connected, as shown, between the terminal $9^c$ and contact $t^3$ through the conductors $t^{10}$ and a terminal $t^{11}$. The telephone receiver and transmitter diagrammatically shown are fully described in the specification of U. S. Patent No. 759697 dated May 10th 1904, but as the same forms no part of the present invention are not here more fully alluded to.

The terminals and contacts in the exchange telephonic instrument $T^1$ are similar to those in the distant telephonic instrument T and are similarly marked. The terminals $6^c$, $7^c$, $8^c$ thereof are respectively connected by three conductors $w^1$, $w^2$, $w^3$ to three separate terminals $20^\times$, $40^\times$, and $50^\times$ in the terminal chamber, and terminal $9^c$ is connected by a fourth conductor $w^4$ to bus bar $10^a$. Terminals $40^\times$ and $50^\times$ are also connected (see Fig. 8) to the rotary contacts $4^a$ and $5^a$ respectively of the spring drum $f$ of the exchange plug. Terminal $20^\times$ is connected up as hereinafter described. Fig. 9 also shows how the bus bar $3^a$ is connected with the negative terminal of the electric current source for the telephones, through the terminal bar $u$ of a combined terminal and fuse box $u^2$, the positive terminal of the said electric current source being connected to the terminal bar $u^1$, the remaining contacts $u^3$ and $u^4$ being respectively connected to opposite ends of ordinary line coils $v$. The several contacts $2^a$ in the terminal chamber $d$ are connected to the positive terminal bar $u^1$ of the current source through the corresponding terminals $u^4$, one such connection being individually shown and the others represented as grouped in the trunk or cable $u^5$. The exchange terminal $20^\times$ is also connected to the positive telephone terminal bar $u^1$ through a conductor $u^6$ and a line coil $v$.

The line coils $v$ are employed in cases where the electric current supplied to the terminal bars $u$ $u^1$ for the telephones is produced by a dynamo-electric machine. In this case, the said coils which are made of a suitable inductive value, serve to render the current steady and prevent any noise, due to commutation in the machine, from being produced in the telephonic apparatus. They also serve to prevent overhearing or cross speaking when a number of telephones are in connection. The arrangement is such that upon a call being given to the exchange from a distant station by operating the bell push of the telephonic instrument T at that station, so as to force contact $t^6$ therein against contact $t^2$, the ringing relay $p^1$ corresponding to the calling station will be operated and cause the corresponding red lamp $k^1$ to light and also ring the exchange bell $B^1$ if it be in circuit. The circuit of the ringing relay $p^1$ is (see Fig. 8) from the positive bus bar $10^a$ through the parts 10, $10^b$, $9^b$, 9, $9^a$, and conductor $s^4$ to the parts $9^c$, $t^6$, $t^2$, $t^4$ $8^c$ and conductor $s^3$ to the parts $8^a$, 8, $8^b$, $5^b$, 5, winding $p^2$ of the ringing relay $p^1$, $11^e$, $11^c$ and 11 to the negative bus bar $11^a$. The operation of the armature $p^4$ $p^5$ of the ringing relay $p^1$ thereby produced, causes the ringing lamp $k^1$ to be put in a parallel circuit between the bus bar $10^a$ and the terminal $p^*$ of the ringing relay $p^1$ through the parts 10, $k^1$, $1^c$ and $1^d$. The operation of the relay $p^1$ at the same time connects the exchange bell $B^1$ in another parallel circuit between the terminal $p^\times$, which is connected to the bus bar $11^a$ as above described, and the bus bar $10^a$, through the parts $1^d$, $1^c$, $1^b$, 1, $1^a$ and bell $B^1$. The exchange attendant will then insert the exchange plug $j$ in the jack corresponding to the calling station and reply. This is rendered possible as follows. By the insertion of the plug in the jack, the plug contacts 4* and 5* will be caused to bear against the jack contacts $8^b$ and $7^b$ respectively and force these contacts from contacts $5^b$ and $4^b$ respectively and cause them to force contact $9^b$ from $10^b$ and into contact with $11^b$, and contact $6^b$ from $2^b$ and into contact with $3^b$, and the operators at the calling station T and exchange station will each operate the switch cam $t^9$ of his instrument to force the switch contact $t^4$ from contact $t^2$ to contact $t$, and the contact $t^5$ from $t^3$ to $t^1$. The transmitter $t^7$ of the exchange instrument $T^1$ and the receiver $t^8$ of the distant instrument T will then be connected up in series circuit with each other, as also will the receiver $t^8$ of the exchange instrument $T^1$ with the transmitter $t^7$ of the distant instrument T, the two circuits being in parallel, as usual, between the positive and negative bus bars $u^1$ and $3^a$. The circuit of the transmitter $t^7$ of instrument $T^1$ and the receiver $t^8$ of the instrument T is completed through the following parts, viz., from the positive terminal $20^\times$ through conductor $w^1$ to terminal $6^c$, transmitter $t^7$, and parts $t$, $t^4$ and $8^c$ of instrument $T^1$ and through conductor $w^3$ to terminal $50^\times$; thence through the drum contact $5^a$ to exchange plug contact $5^\times$, jack contact $7^b$, terminals 7 and $7^a$ and conductor $s^2$ to terminal $7^c$ and parts $t^5$, $t^1$, receiver $t^8$ and terminal $6^c$ of instrument T; then through conductor $s^1$ to the parts $6^a$, 6, $6^b$, $3^b$ and 3 to the negative bus bar $3^a$. The circuit of the receiver $t^8$ of instrument $T^1$ and the transmitter $t^7$ of instrument T is from terminal $20^\times$ to terminal $6^c$ of instrument $T^1$ as before, receiver $t^8$ and parts $t^1$, $t^5$ and $7^c$ of that instrument and conductor $w^2$ to terminal $40^\times$; plug contact $4^\times$ to jack contact $8^b$, and terminals 8, $8^a$ through conductor $s^3$ to terminal $8^c$, contacts $t^4$ and $t$, transmitter $t^7$ and terminal $6^c$ of instrument T, thence through conductor $s^1$, as before, to contacts $6^a$, 6, $6^b$, $3^b$ and 3 to bus bar $3^a$.

Upon receiving instructions as to the connection required, the exchange attendant will insert the plug $j$ corresponding to the calling station into the jack corresponding to the station required, or vice versa, and leave the calling station to ring up, or, if more convenient, the attendant can ring up the required station and complete the circuit upon receiving an answer. When the two stations are in telephonic connection, diagrammatically indicated in Fig. 10, the speaking relay $p$ corresponding to the calling or called station, according to which plug is employed to complete the connection, will be operated and the corresponding white lamp $k^2$ caused to glow until conversation is ended when the circuit will be broken and the lamp will cease to glow, whereupon the attendant should remove the plug $j$ and allow it to return to its original position.

Figure 10:
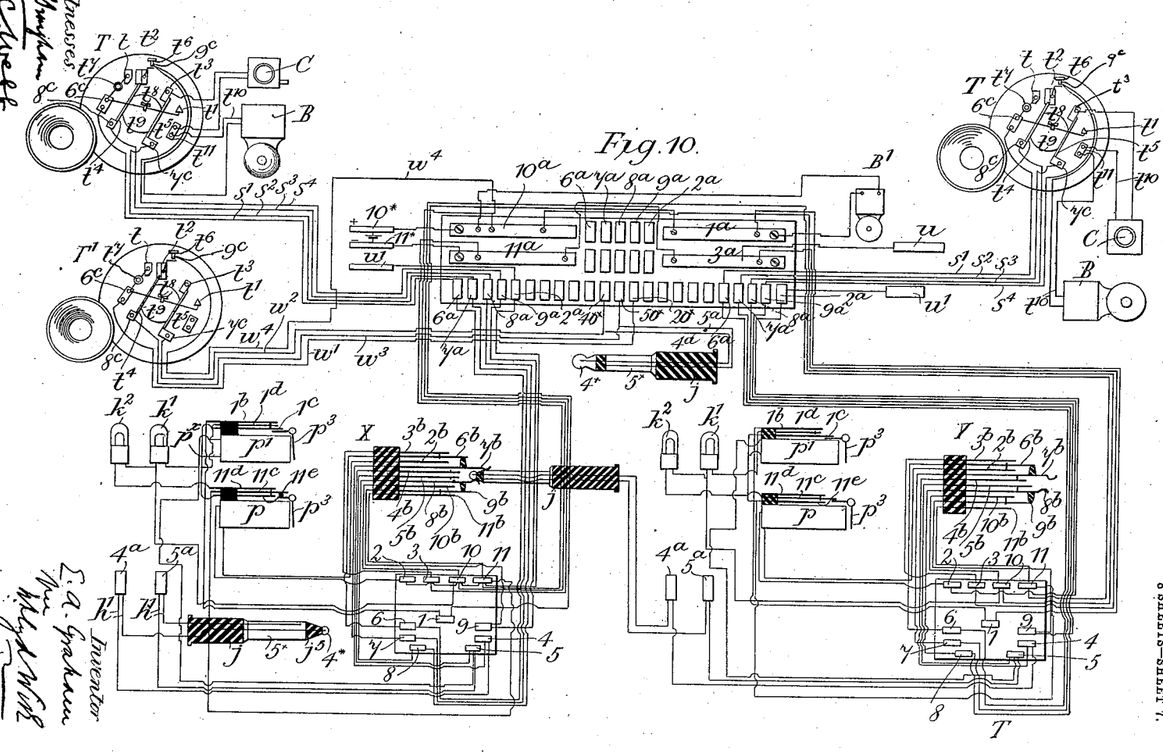

When the two distant instruments T, T are connected up through their two sections X and Y by a plug as described and as shown in Fig. 10, either station can ring up the other. For example, the operator at the instrument T, shown to the left in Fig. 10, can ring the bell B of the instrument T shown to the right in the said figure by pressing contact $t^6$ of his instrument against contact $t^2$ thereof, the circuit being then as follows:—From the negative bell bus bar $11^a$ to contacts 11, $11^b$, $9^b$, 9 of section X, thence to the corresponding terminal $9^a$, through conductor $s^4$ to terminals and contacts $9^c$, $t^6$, $t^2$, $t^4$, $8^c$, conductor $s^3$, terminals and contacts $8^a$, 8 and $8^b$, thence to plug contact 4* of the plug $j$ corresponding to section Y. The current then passes by terminals and contacts $4^a$, 4, $4^b$, $7^b$, 7, $7^a$, and conductor $s^2$ to telephone T at the right hand side of the diagram; through this telephone the circuit is continued by terminals and contacts $7^c$, $t^5$, $t^3$, to indicator C, then by terminal $t^{11}$ to bell B and by terminal $9^c$ and conductor $s^4$ to the following terminals and contacts corresponding to section Y, viz:—$9^a$, 9, $9^b$, $10^b$, 10 to positive bell bus bar $10^a$ thus completing the ringing circuit between instrument T on the left and the indicator and bell of instrument T on the right of the diagram. In a similar way, the operator at the right hand instrument T can ring the bell B of the left hand instrument T through a circuit that can be readily traced from the foregoing description. When the operators at the two instruments T have operated their switch cams $t^9$ to open the bell circuits and close the transmitter and receiver circuits, then telephonic communication can be carried on between the two stations, the transmitter and receiver of one instrument being, as before, in circuit with the receiver and transmitter respectively of the other instrument in parallel circuits. For example, the circuit of the transmitter of the right hand instrument and the receiver of the left hand instrument is as follows:—From positive telephone bus bar $u^1$ to terminals and contacts $2^a$, 2, winding of speaking relay $p$ and terminals $2^b$, $6^b$, 6 and $6^a$ of section Y (Fig. 10) then through conductor $s^1$ to terminal $6^c$ of the right hand instrument T, transmitter $t^7$, and contacts $t^2$, $t^4$ and terminal $8^c$ of that instrument, and through conductor $s^3$ to terminals and contacts $8^a$, 8, $8^b$, $5^b$, 5 of section Y to drum and plug contacts $5^a$, 5; thence through contacts and terminals $7^b$, 7 and $7^a$ of section X and conductor $s^2$ to the terminal and contacts $7^c$, $t^5$ and $t^1$, receiver $t^8$ and terminal $6^c$ of the left hand instrument T; then through conductor $s^1$ to the terminals and contacts $6^a$, 6, $6^b$, $3^b$, and 3 of section X to the negative telephone bus bars $3^a$ and $u$. The parallel circuit including the receiver $t^8$ of the right hand instrument and the transmitter $t^7$ of the left hand instrument is from terminal 6 of the right hand instrument through receiver $t^8$, contacts $t^1$, $t^5$ and terminal $7^c$ thereof and conductor $s^2$ to the terminals and contact $7^a$, 7, $7^b$, $4^b$, and 4 of section Y to the corresponding drum and plug contacts $4^a$, $4^\times$, through the contacts and terminals $8^b$, 8 and $8^a$ of section X; then through conductor $s^3$ to terminal $8^c$, contacts $t^4$ and $t$ and transmitter $t^7$ of the left hand instrument to terminal $6^c$ thereof which is connected, as above described to the negative bus bars $3^a$ and $u$. The passage of the current through the winding of the speaking relay $p$ of section Y, causes the armature $p^3$ thereof to move the contact $11^c$ from $11^e$ and press it against $11^d$ and complete the circuit of the corresponding speaking lamp $k^2$ across the bus bars $10^a$, $11^a$ through the connections 10, $k^2$, $11^d$, $11^c$ and 11 and cause the speaking lamp $k^2$ to glow while the instruments are connected up for speaking.

When the telephonic communication is finished and the instruments T restored to their normal condition by allowing or causing the switch cams $t^9$ to return to their normal position to switch the transmitters and receivers out of circuit and leave the bell circuits in a condition to be closed, the lamp circuit will be broken and the exchange operator will remove the plug $j$ from the jack in which it was inserted and restore it to its normal position. In the event of an engaged line and station being required by another station, the exchange operator can plug in and advise either station of the connection required.

All the electrical connections in switchboard apparatus such as hereinbefore described are adapted to be made and broken from the front of the apparatus. To accommodate the connecting wires between the terminals in the terminal chamber $d$ and the terminals on each carrier $c^1$, the vertical front plate $o^1$ through which the carriers extend, may be formed with vertical and horizontal channels $b^3$ (Fig. 2) of suitable size and located between the sections.

Under certain circumstances it may be found desirable to enable the exchange, or one or more of the outlying telephone stations, to transmit orders to several other stations at the same time. This may be effected by providing additional plugs $j$ (Fig. 8) representing such station or stations and connected in parallel with the original plug. These additional plugs, together with their spring drums and contacts, may be contained within the drum compartment $e$ of the switchboard, or within a separate casing and fitted independently.

Figure 11:
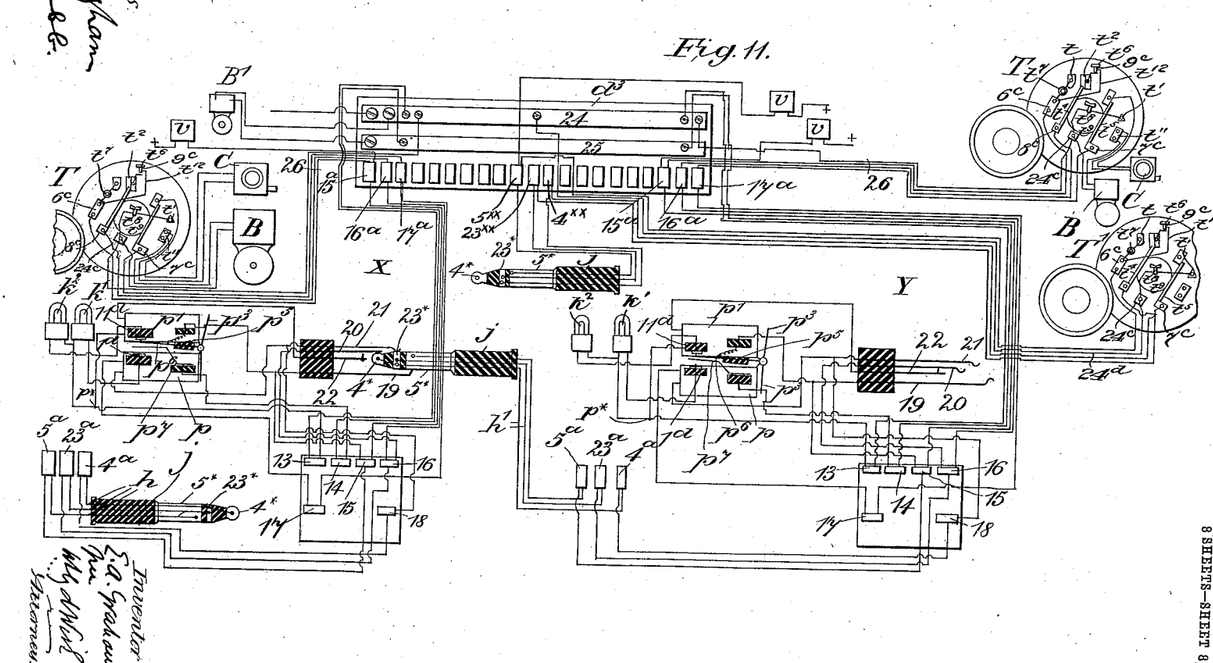

A telephonic exchange switch-board embodying the several novel features of the present invention can be constructed in various forms and the details modified in various ways, without departing from the essential nature thereof. Thus, Fig. 11 is a similar view to Fig. 10, but showing the apparatus adapted for use in the case where the telephone bell and speaking circuits are worked off one source of electric supply instead of being worked off separate sources of supply as in the arrangement of apparatus shown in Figs. 1 to 10 inclusive. In this modified arrangement, each of the removable sections or units is provided only with six terminals numbered 13 to 18 respectively; the corresponding jack comprises four spring contact blades numbered respectively 19, 20, 21, 22; the plug $j$ is provided with three insulated contacts $4^\times$, $5^\times$ and $23^\times$ connected through conductors $h^1$ and the contact rings on the corresponding cord drum to three rubbing or rolling contacts $4^a$, $5^a$ and $23^a$ respectively; the pivoted armatures $p^3$ of the speaking and ringing relays $p$ and $p^1$ are connected together and provided with a common arm $p^5$ carrying an insulated movable contact $p^6$ arranged so as to make contact with a fixed contact $11^d$ when the speaking relay $p$ is operated, and alternately with a spring contact $p^7$ which is at the same time pressed into connection with a fixed contact $1^d$ when the ringing relay $p^1$ is operated. Upon the insulated support $d^3$ in the terminal chamber $d$ are fixed two bus bars 24 and 25, and a number of groups of terminals of which there is one group for each removable section $c$ and the corresponding telephonic apparatus as before, each group comprising three terminals $15^a$, $16^a$ and $17^a$. Terminal 13 is connected to one terminal of the ringing lamp $k^1$ and of the speaking lamp $k^2$, to one end of the winding of the ringing relay $p^1$, and to the bus bar 24 which is connected to the negative pole of a source of electrical energy. Terminal 14 is connected to the spring contact $p^7$, and to the bus bar 25 which is connected to one terminal of the electric bell at the exchange, the other terminal of such bell being connected to the bus bar 24. Terminals 15, 16 and 17 are connected respectively to the corresponding group of terminals $15^a$, $16^a$ and $17^a$ which, as well as bus bar 24, are connected to the corresponding telephonic apparatus at a distance through the four line wires shown collectively at 26, the terminal $15^a$ being also connected to the positive pole of the source of electric supply, as through a line coil $v$, as in Fig. 9. Terminal 15 is also connected to the jack contact 19, to the movable relay contact $p^6$, and to the drum contact $5^a$ and consequently to the plug contact 5*. Terminal 16 is also connected to the jack contact 20 and to the drum contact $23^a$ and consequently with the plug contact $23^\times$. Terminal 17 is also connected to one end of the winding of the speaking relay $p$ the other end of which is connected to the jack contact 21. The jack contact 22 is connected to the second end of the winding of the ringing relay $p^1$. The second terminal of the speaking lamp $k^2$ is connected to the relay contact $11^d$. The jack contact 20 normally bears against jack terminal 22. The plug contacts $4^\times$, $5^\times$ and $23^\times$ are adapted, when the plug is forced into place in the jack of a second instrument, to bear against the jack contacts 20, 19, and 21 respectively thereof and to move contact 20 out of connection with contact 22.

With the modified arrangement above described, assuming the plugs to be in their normal position then, upon the bell push of a telephonic apparatus at a distant station being operated, to call up the exchange, a current will pass through the ringing relay $p^1$ of the apparatus at the exchange. The movement of the relay armature $p^3$ thereby produced closes the circuit of the ringing lamp $k^1$ and also that of the exchange bell, if the same is in circuit, thereby indicating a call. The exchange operator then inserts the exchange plug into the jack of the calling station, whereby the line wires of the exchange and calling station telephones are connected by the contacts $4^\times$, $5^\times$ on the plug and the jack contacts 20 and 19. The third connection formed between the remaining plug contact $23^\times$ and jack contact 21 parallels the current supply of the two circuits, that is to say, places the positive supply lines of the two connected telephonic apparatus in parallel with one another, each through its own line coil. By the movement of the jack contact 20, by the plug contact $4^\times$, the circuit through the ringing relay $p^1$ is broken. Upon the operator pressing the bell push of his telephonic apparatus, the bell of the calling station will be caused to ring and when the telephonic switches of the two connected telephonic instruments are operated, the one by the exchange operator and the other by the operator at the calling station, the exchange operator can ask the other operator what station he requires to be connected to. The exchange operator then removes his plug and inserts the plug of the calling station into the jack of the station required for connection. Connection is made in an analogous manner to that above described and the ringing relay $p^1$ corresponding to the calling station, is cut out of circuit, and the windings of the relays being suitably arranged, as hereinbefore described, the speaking relay corresponding to the called station operates successfully against the ringing relay of the calling station, which has a tendency to operate independently as it is not cut out of circuit as is the case of the ringing relay of the called station. When the bell push at one station is depressed, the telephone bell at the other station is operated.
Upon the switches of the telephonic apparatus at the two connected stations being operated, conversation can take place between the two stations as long as they are connected, the speaking relays being operated and the speaking lamps glowing to indicate that conversation is taking place. When the conversation is finished and the switches moved or allowed to move into their normal positions, the speaking relays $p$ assume their normal positions and the circuits of the speaking lamps $k^2$ are broken, whereupon the station operator withdraws the plug of the calling station from the jack of the called station. The various circuits for enabling the above described operations to take place, can be readily traced from the drawings without further detailed description.

It may be found desirable in some instances to arrange for the speaking lamp $k^2$ to glow when the conversation between two connected stations is finished and the telephones have been replaced, and in this manner give the signal to the exchange operator that the plug may be removed. This may be accomplished by some slight modification to the connections of the spring contacts of the speaking relay and to the addition to, or may be re-arrangement of the jack springs. Thus, the circuit of the speaking lamp may be arranged to be closed only when the armature of the corresponding relay is in its normal position and the circuit completed by the connection of two spring contacts actuated by the insertion of the plug in the jack, so that when the circuit is broken through the relay, on account of the conversation being finished, the lamp circuit is completed and remains closed so long as the plug remains in the jack but as soon as the plug is withdrawn the jack springs previously in contact are separated and the lamp circuit broken.

What I claim is:—

1. A weather resisting telephonic exchange switch-board, comprising a casing having a central chamber adapted to receive a number of separately removable instrument sections or units each comprising a carrier, ringing and speaking lamps and relays, insulated terminals and a plug jack, an upper chamber adapted to contain a number of electrical terminals, a lower chamber adapted to receive a number of independent contacting devices for the instrument plug cords, and means for closing such chambers in a watertight manner, said chamber closing means being provided with holes through which jack plugs can be inserted in the corresponding jacks and glazed openings arranged to be opposite the lamps.

2. A telephonic exchange switch-board, comprising a casing having a central chamber adapted to receive a number of separately removable instrument sections or units each comprising a carrier ringing and speaking lamps and relays, insulated terminals and a plug jack, an upper chamber adapted to contain a number of electrical terminals, a lower chamber adapted to receive a number of independent contacting devices for the instrument plug cords, and doors for independently closing each of such chambers, the door for said central chambers having holes through which the jack plugs can be inserted into the jacks, and also glazed openings arranged to be opposite the lamps.

3. A telephonic exchange switch-board, comprising a casing having a central chamber adapted to receive a number of separately removable instrument sections or units, an upper chamber adapted to contain a number of electrical terminals, a lower chamber adapted to receive a number of independent contacting devices for the instrument plug cords, a hinged front door for the central chamber and bodily removable front doors for the upper and lower chambers.

4. A weather resisting telephonic exchange switch board, comprising a casing having a central chamber adapted to receive a number of separately removable instrument sections or units, an upper chamber adapted to contain a number of electrical terminals, a lower chamber adapted to receive a number of independent contacting devices for the instrument plug cords, a hinged front door for the central chamber, bodily removable front doors for the upper and lower chambers and glands in the upper chamber through which the conductors from external telephonic apparatus can pass in a watertight manner.

5. A telephonic exchange switch board comprising a casing having a central chamber adapted to receive a number of separately removable instrument sections or units provided with jacks, an upper chamber adapted to contain a number of electrical terminals, a lower chamber adapted to receive a number of independent contacting devices for the instrument plug cords, a horizontal shelf in front of the lowermost chamber to support the several instrument plugs, a hinged front door having jack plug holes therethrough for the central chamber and movable front doors for the upper and lower chambers.

6. A weather resisting telephonic exchange switchboard, comprising a casing having a central chamber adapted to receive a number of separately removable instrument sections or units provided with jacks, an upper chamber adapted to contain a number of electrical terminals, a lower chamber adapted to receive a number of independent contacting devices for the instrument plug cords, a horizontal shelf in front of the lowermost chamber to support the several instrument plugs, a hinged front door provided with jack plug holes for the central chamber, removable front doors for the upper and lower chambers and glands in the upper chamber through which the conductors from external telephonic apparatus can pass in a watertight manner.

7. A telephonic exchange switch-board, comprising a casing having a central chamber provided with a number of separately removable instrument sections or units each comprising a carrier, ringing and speaking lamps and relays, insulated terminals and a plug jack, an upper chamber provided with a number of electrical terminals, a lower chamber provided with a number of independent contacting devices for the instrument plug cords, electrical connections between the several terminals and contacting devices, and means for closing such chambers in a water tight manner, said chamber closing means being provided with holes through which jack plugs can be inserted in the corresponding jacks and glazed openings arranged to be opposite the lamps.

8. In a telephonic exchange switch board, a plurality of separately removable instrument sections or units each complete in itself and comprising a set of jack contacts and a set of corresponding terminals connected to said jack contacts and adapted to be connected to the corresponding jack plug and to a separate set of electrical terminals for connection to an external telephonic instrument and to an electric generator and bell, and a casing inclosing said sections or units and having a door provided with openings through which the jack plugs can be inserted into the jacks, substantially as described.

9. A telephonic exchange switch board, comprising a central chamber, an upper chamber and a lower chamber a plurality of instrument sections or units mounted within the central chamber so as to be separately removable therefrom, and a hinged door normally confining the instrument sections or units in said central chamber.

10. A telephonic exchange switch board, comprising a central chamber, an upper chamber and a lower chamber, a plurality of instrument sections or units mounted within the central chamber, lamp and plug sockets in each section or unit, and a door for said central chamber provided with openings coinciding in position with such sockets.

11. In a telephonic exchange switch board, a removable instrument section or unit comprising a carrier having two vertical supports one in front of the other, lamp sockets on the rear support arranged opposite openings in the front support, and incandescent electric lamps extending through the openings in the front support to the sockets upon the rear supports.

12. In a telephonic exchange switch board, a removable instrument section or unit comprising a carrier having two vertical supports one in front of the other and a lower hollow portion, speaking and ringing relays behind the rear support, a plug jack in the lower portion of the carrier, an insulating plate carried by the front support, independent terminals upon such plate for connection to the relays and jack, lamp sockets fixed upon the rear support opposite openings in the front support and plate, speaking and ringing lamps extending through the openings in the front support and plate to sockets upon the rear supports, and a similar opening in the front support and plate constituting a plug socket.

13. A telephonic exchange switch board comprising a central chamber, an upper chamber and a lower chamber, a plurality of instrument sections or units comprising jacks and lamps, a vertical plate in the central chamber having holes through which such sections or units extend and means for temporarily securing such sections or units to said vertical plate, and a cover plate secured in front of said vertical plate and provided with holes through which jack plugs can be inserted into the jacks and glazed openings opposite said lamps.

14. A telephonic exchange switch board, comprising a central chamber, an upper chamber and a lower chamber, a plurality of instrument sections or units, a vertical plate in the central chamber having holes through which such sections or units extend, means for temporarily securing said sections or units to said vertical plate, and a hinged door confining all the sections or units in the central chamber.

15. A telephonic exchange switch board, comprising a casing having three superposed chambers, a perforated front door for the central chamber, movable front doors for the upper and lower chambers, a horizontal shelf in front of the lowermost chamber, jack plugs supported by said shelf, spring drums in the lowermost chamber, connection cords between said jack plugs and drums, insulated contact rings on one side of each drum, spring pressed contacts engaging the drum contact rings, and a stationary insulated support for carrying the spring pressed contacts within the said lower chamber of the casing.

16. A telephonic exchange switch board, comprising a casing having three superposed chambers, a perforated front door for the central chamber, movable front doors for the upper and lower chambers, a horizontal shelf in front of the lowermost chamber, jack plugs supported by said shelf, spring drums in the lowermost chamber, connection cords between said jack plugs and drums, insulated contact rings on one side of each drum, rolling contacts engaging the drum contact rings, spring actuated carrying arms for such rolling contacts, and insulated bearings in the lower chamber about which the contact carrying arms turn.

17. A telephonic exchange switch board, comprising a central chamber, removable instrument sections or units in such chamber and a watertight door closing said chamber, an upper chamber, an insulated support therein, a group of terminals for each instrument section or unit fixed to said support and a removable cover for said upper chamber, a lower chamber, spring influenced drums and contacts in said lower chamber, jack plugs connected to the drum contacts, a cover for the front of said lower chamber, and a shelf in front of the last mentioned cover for supporting the jack plugs.

18. A telephonic exchange switch board, comprising a casing having a central chamber, an upper chamber and a lower chamber, removable instrument sections or units in the central chamber, an insulated support in the upper chamber, groups of terminals secured to such support, one group for each removable instrument section or unit, rotary spring drums carrying contacts in the lower chamber, and jack plugs connected to the contacts of each drum, the contacts of one of said drums having a plurality of jack plugs connected in parallel thereto.

19. A telephonic switch board comprising a casing having a central chamber, removable instrument sections or units in such chamber, each of such sections or units carrying a set of insulated terminals, speaking and ringing lamps, speaking and ringing relays and a set of jack contacts, an upper chamber, a support in such upper chamber, groups of insulated terminals secured to said support, one group for each removable section or unit and for each telephonic instrument connected to the switch board, insulated bus bars fixed to said support, a lower chamber, a plurality of spring drums mounted in said lower chamber and carrying insulated contacts, a plurality of jack plugs, cords containing insulated conductors connecting said drum contacts to said jack plugs, and electrical connections between the sets of terminals on the sections or units, the sets of terminals in the upper chamber, the speaking and ringing relays and lamps, the bus bars, the jack contacts and the drum contacts, substantially as described and shown for the purposes set forth.

Signed at London England this 10th day of June 1907.

EDWARD ALFRED GRAHAM.

Witnesses:
W. BARNARD,
H. W. DIPROSE.